US010349420B2

(12) United States Patent
Wang et al.

(10) Patent No.: US 10,349,420 B2
(45) Date of Patent: Jul. 9, 2019

(54) METHOD AND APPARATUS FOR NETWORK SCHEDULING

(71) Applicant: MEDIATEK INC., Hsinchu (TW)

(72) Inventors: James Wang, Cupertino, CA (US);
Hsin-Ying Lee, Kaohsiung (TW);
Shih-Chieh Yen, Taipei (TW);
Ming-Yu Hsieh, Taichung (TW);
Pei-Kai Liao, Nantou County (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/990,715

(22) Filed: May 28, 2018

(65) Prior Publication Data

US 2018/0352544 A1    Dec. 6, 2018

Related U.S. Application Data

(60) Provisional application No. 62/513,498, filed on Jun. 1, 2017.

(51) Int. Cl.
*H04W 72/04* (2009.01)
*H04L 5/00* (2006.01)

(52) U.S. Cl.
CPC ......... *H04W 72/048* (2013.01); *H04L 5/0039* (2013.01); *H04W 72/042* (2013.01); *H04W 72/0453* (2013.01)

(58) Field of Classification Search
CPC ... H04W 72/082; H04W 16/02; H04W 88/08; H04W 16/30
USPC ............... 455/450, 452.1, 518; 370/329, 347
See application file for complete search history.

(56) References Cited

U.S. PATENT DOCUMENTS

| | | | |
|---|---|---|---|
| 2006/0116149 A1* | 6/2006 | Dunn | H04W 84/08 455/518 |
| 2011/0261765 A1 | 10/2011 | Nagaraja | |
| 2012/0120890 A1* | 5/2012 | Jang | H04B 7/022 370/329 |
| 2012/0184327 A1 | 7/2012 | Love et al. | |
| 2017/0051608 A1* | 2/2017 | Boyanapally | E21B 17/028 |
| 2017/0150503 A1* | 5/2017 | Fukuta | H04W 72/0426 |
| 2017/0310458 A1* | 10/2017 | Zanuso | H04L 7/0331 |

FOREIGN PATENT DOCUMENTS

GB    2485387 A    5/2012

OTHER PUBLICATIONS

Extended Search Report dated Oct. 9, 2018 in European Patent Application No. 18175306.2.

* cited by examiner

*Primary Examiner* — Sam Bhattacharya
(74) *Attorney, Agent, or Firm* — Oblon, McClelland, Maier & Neustadt, L.L.P.

(57) ABSTRACT

Aspects of the disclosure provide a control apparatus that includes transceiver circuitry and processing circuitry. The transceiver circuitry is configured to transmit/receive signals from a plurality of terminal devices using a shared channel. The processing circuitry is configured to determine distances to the plurality of terminal devices, allocate resource elements in the shared channel according to the distances, and communicate, via the transceiver circuitry, with the plurality of terminal devices according to the allocation of the resource elements in the shared channel.

18 Claims, 5 Drawing Sheets

METHOD AND APPARATUS FOR NETWORK SCHEDULING

INCORPORATION BY REFERENCE

This present disclosure claims the benefit of U.S. Provisional Application No. 62/513,498, "Network Scheduling for Wide-band MU-OFDMA Operation for MPR/A-MPR and Out-of-band Emission Mitigation" filed on Jun. 1, 2017, which is incorporated herein by reference in its entirety.

TECHNICAL FIELD

The present disclosure describes embodiments related to network scheduling technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a wireless communication network, a network provider can use a shared channel to transmit data to one or more user equipment. In an example, the network provider provides control information of the shared channel to the one or more user equipment. Then the one or more user equipment can receive data transmitted by the shared channel and transmit data using the shared channel according to the control information.

SUMMARY

Aspects of the disclosure provide a control apparatus that includes transceiver circuitry and processing circuitry. The transceiver circuitry is configured to transmit/receive signals from a plurality of terminal devices using a shared channel. The processing circuitry is configured to determine distances to the plurality of terminal devices, allocate resource elements in the shared channel according to the distances, and communicate, via the transceiver circuitry, with the plurality of terminal devices according to the allocation of the resource elements in the shared channel.

According to an aspect of the disclosure, the processing circuitry is configured to allocate a first resource element of a first frequency to a first terminal device and allocate a second resource element of a second frequency to a second terminal device. The second terminal device has a longer distance to the control apparatus than the first terminal device, the second frequency is closer to a center frequency of the shared channel than the first frequency.

In some embodiments, the processing circuitry is configured to allocate a group of resource elements that are contiguous in frequency to a terminal device. Further, the processing circuitry is configured to allocate a first group of resource elements that are contiguous in frequency to a first terminal device, and allocate a second group of resource elements that are contiguous in frequency to a second terminal device, the second terminal device has a longer distance to the control apparatus than the first terminal device. The second group of resource elements is closer to a center frequency of the shared channel than the first group of resource elements.

In an embodiment, the processing circuitry is configured to determine transmission power levels for the terminal devices according to the distances.

In some embodiments, the processing circuitry is configured to avoid an allocation of a first resource element near an upper frequency boundary of the shared channel and a second resource element near a lower frequency boundary of the shared channel to a same terminal device.

In an embodiment, the processing circuitry is configured to allocate a first frequency sub-band of the shared channel to a first terminal device, and allocate a second frequency sub-band of the shared channel to a second terminal device. The second terminal device has a longer distance to the control apparatus than the first terminal device, and the second frequency sub-band is closer to a center frequency of the shared channel than the first frequency sub-band.

Aspects of the disclosure provide a method for network scheduling. The method includes determining, by processing circuitry in a control apparatus, distances from the control apparatus to a plurality of terminal devices, allocating resource elements in a shared channel according to the distances, and communicating, via interface circuitry of the control apparatus, with the plurality of terminal devices according to the allocation of the resource elements in the shared channel.

Aspects of the disclosure provide an apparatus that includes transceiver circuitry and processing circuitry. The transceiver circuitry is configured to receive wireless signals that are indicative of resource allocation information of resource elements in a channel that is shared by the apparatus and other apparatuses. The resource allocation information has been determined by a control apparatus that allocates the resource elements in the channel based on a distance between the control apparatus and the apparatus. The processing circuitry is configured to extract the resource allocation information, and communicate with the control apparatus using the resource elements in the channel according to the resource allocation information.

According to an aspect of the disclosure, the apparatus includes an oscillator is configured to oscillate at an oscillation frequency, and provide a reference signal to the transceiver circuitry. The processing circuitry is configured to control the oscillator to adjust the oscillation frequency according to the resource allocation information. In an example, the processing circuitry is configured to control the transceiver circuitry to wait for the oscillator to settle after an adjustment of the oscillation frequency. In some embodiments, the processing circuitry is configured to determine a center frequency of allocated resource elements to the apparatus, and control the oscillator to oscillate at the center frequency.

In an embodiment, the processing circuitry is configured to extract the resource allocation information that is indicative of allocated resource elements to the apparatus, the allocated resource elements being contiguous in a frequency range. Further, in an example, the processing circuitry is configured to decode symbols according to the frequency range.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide techniques in a network to allocate wireless transmission resources in a channel that is shared by multiple users (e.g., user devices) based on distances from the users to infrastructure of the network. In a cellular radio system, a land area to be supplied with radio service is divided into cells. Each of these cells has a base station with a fixed location transceiver. The base station provides radio coverage to a surrounding area that is referred to as a cell in an example. Each cell is assigned with a channel that can be used for wireless communication between the base station and the users in the cell. The channel has a characteristic in the frequency domain, such as a frequency range from a lower frequency boundary to an upper frequency boundary. The channel can be used for wireless communication in the cell. The frequency range can also be defined by a channel bandwidth (the width of the frequency range) and a center frequency (the center of the frequency range). Generally, adjacent cells are assigned with different frequency ranges (e.g., non-overlapping frequency ranges), and channels of the same frequency range can be reused by non-adjacent cells.

In some embodiments, a cell serves multiple users (e.g., user devices), and the channel is shared by the multiple users. Each user is allocated with a portion of transmission resources of the channel in time and/or frequency domain. According to an aspect of the disclosure, a far-out user (e.g., a user device that is far from the base station of the cell) is allocated with transmission resources (downlink and/or uplink transmission resources) of frequencies that are closer to the center frequency than that of a nearby user (e.g., a user device that nears the base station of the cell).

Figure 1:
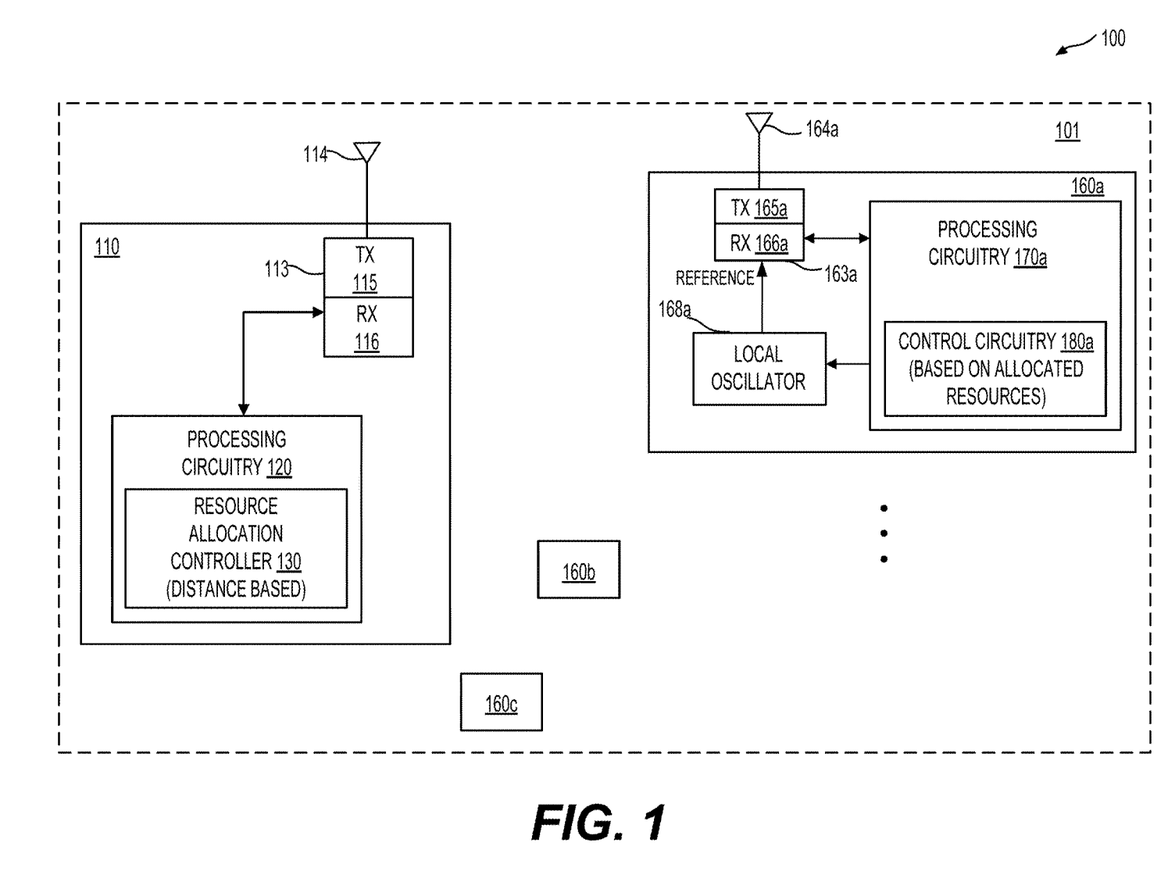
FIG. 1 shows a block diagram of an exemplary communication system 100 according to an embodiment of the disclosure.

FIG. 1 shows a block diagram of an exemplary communication system 100 according to an embodiment of the disclosure. The communication system 100 includes a first electronic device 110 that communicates with one or more second electronic devices 160a-160c using a shared channel. The first electronic device 110 is configured to allocate resource elements of the shared channel based on distances from the second electronic devices 160a-160c to the first electronic device 110. The allocated resource elements are used for communication with the second electronic devices 160a-160c.

In an embodiment, the first electronic device 110 is configured to concentrate allocated resource elements to a second electronic device in the frequency domain to enable a scaling of power consumption with the number of resource elements. In an example, the first electronic device 110 is configured to allocate a sub-band of resource elements that are contiguous in frequency to a second electronic device. Thus, the bandwidth of the sub-band scales with the number of resource elements that are allocated to the second electronic device. During operation, the second electronic device can ignore frequencies that are out the frequency sub-band. The power consumption in the second electronic device then scales with the number of resource elements that are allocated to the second electronic device.

In addition, the first electronic device 110 is configured to allocate resource elements with frequencies that are closer to the center frequency of the channel to second electronic devices that are far from the first electronic device 110 to reduce inter-channel interference, and to reduce maximum power reduction requirement.

The communication system 100 can be any suitable wireless communication system that uses suitable wireless communication technology, such as second generation (2G) mobile network technology, third generation (3G) mobile network technology, fourth generation (4G) mobile network technology, fifth generation (5G) mobile network technology, global system for mobile communication (GSM), long-term evolution (LTE), a New Radio (NR) access technology, a wireless local area network (WLAN), and the like.

In an embodiment, the first electronic device 110 is an interface node of the network infrastructure for a telecommunication service provider. The first electronic device 110 can be referred to as different names, such as a base transceiver station, a Node B, an evolved Node B (eNB), a next generation Node B (gNB) and the like in different wireless communication technology. The first electronic device 110 includes hardware components and software components to provide a radio coverage to a surrounding area and forms a cell 101 in the communication system 100. The second electronic devices 160a-160c are in the surrounding area, and have subscribed services of the telecommunication service provider. The first electronic device 110 is suitably coupled with other nodes (not shown), such as core nodes in a backbone of the telecommunication service provider, other interface nodes of the telecommunication service provider, and the like. The communication system 110 includes other cells (not shown) that are adjacent or non-adjacent to the cell 101.

In an embodiment, the second electronic devices 160a-160c are terminal devices. In an example, a terminal device is user equipment used by an end-user for mobile telecommunication, such as a cell phone, a smart phone, a tablet computer, a laptop, a wearable device and the like. In another example, a terminal device is a stationary device, such as a desktop computer. In another example, a terminal device is a machine type communication device, such as a wireless sensor, an Internet of things (IoT) device and the like. In some embodiments, when a second electronic device is located near the first electronic device 110, the second electronic device is referred to as a nearby second electronic device; and when a second electronic device is located far from the first electronic device 110, the second electronic device is referred to as a far-out second electronic device.

According to an aspect of the disclosure, the cell 101 is assigned with a channel of a frequency range. The channel is configured to support time division multiplexing (TDM) and/or frequency division multiplexing (FDM). In the frequency domain, in an example, sub-carriers are defined in the frequency domain according to a sub-carrier spacing. In an example, a carrier of 20 MHz bandwidth can include 1200 sub-carriers according to 15 KHz sub-carrier spacing. In another example, a carrier of 160 MHz bandwidth can include 2400 sub-carriers according to 60 KHz sub-carrier spacing. Further, in an example, the shared channel can be divided into sub-bands in the frequency domain. The sub-bands can have the same or different number of sub-carriers. In an example, a carrier of 160 MHz bandwidth can be divided into 20 sub-bands of the same bandwidth per sub-band, thus each sub-band includes 120 sub-carriers.

In the time domain, in an example, the first electronic device 110 is configured to structure transmission in the time duration as radio frames. In an example, each radio frame is 10 ms long and consists of ten sub-frames of 1 ms each. In another example, each radio frame is 10 ms long and consists of forty sub-frames of 0.25 ms each. A sub-frame can be further divided into for example 2 time slots, and a time slot can be divided into 7 symbol periods in an example.

In an embodiment, transmission resources of a shared channel are allocated in time and frequency domains. For example, in the two dimensional time and frequency domain, a resource element (RE) is made up of a symbol in the time domain and a sub-carrier in the frequency domain. Further, in an example, a physical resource block (PRB) is made up of a slot in the time domain and 12 sub-carriers in the frequency domain.

According to an aspect of the disclosure, the first electronic device 110 is configured to allocate transmission resources of a shared channel (e.g., sub-frame in time domain) by frequency sub-bands. In an embodiment, the frequency domain of the shared channel is partitioned into, for example 20 sub-bands of the same or different bandwidths. The first electronic device 110 allocates transmission resources of the shared channel by sub-bands. A sub-band includes transmission resources that are frequency contiguous, and is allocated to a second electronic device.

Further, the first electronic device 110 is configured to allocate sub-bands that are closer to the lower frequency boundary or closer to the upper frequency boundary of the shared channel to nearby second electronic devices that are close to the first electronic device 110. Further, the electronic device 110 is configured to allocate sub-bands that are closer to the center frequency of the shared channel to far-out second electronic devices that are far from the first electronic device 110. In the FIG. 1 example, the second electronic device 160a is a far-out second electronic device and the second electronic devices 160b and 160c are nearby second electronic devices. The distance between the first electronic device 110 and the second electronic device 160a is larger than the distances between the first electronic device 110 and the second electronic devices 160b and 160c. A resource allocation example for the communication system 100 is shown in FIG. 2.

Figure 2:
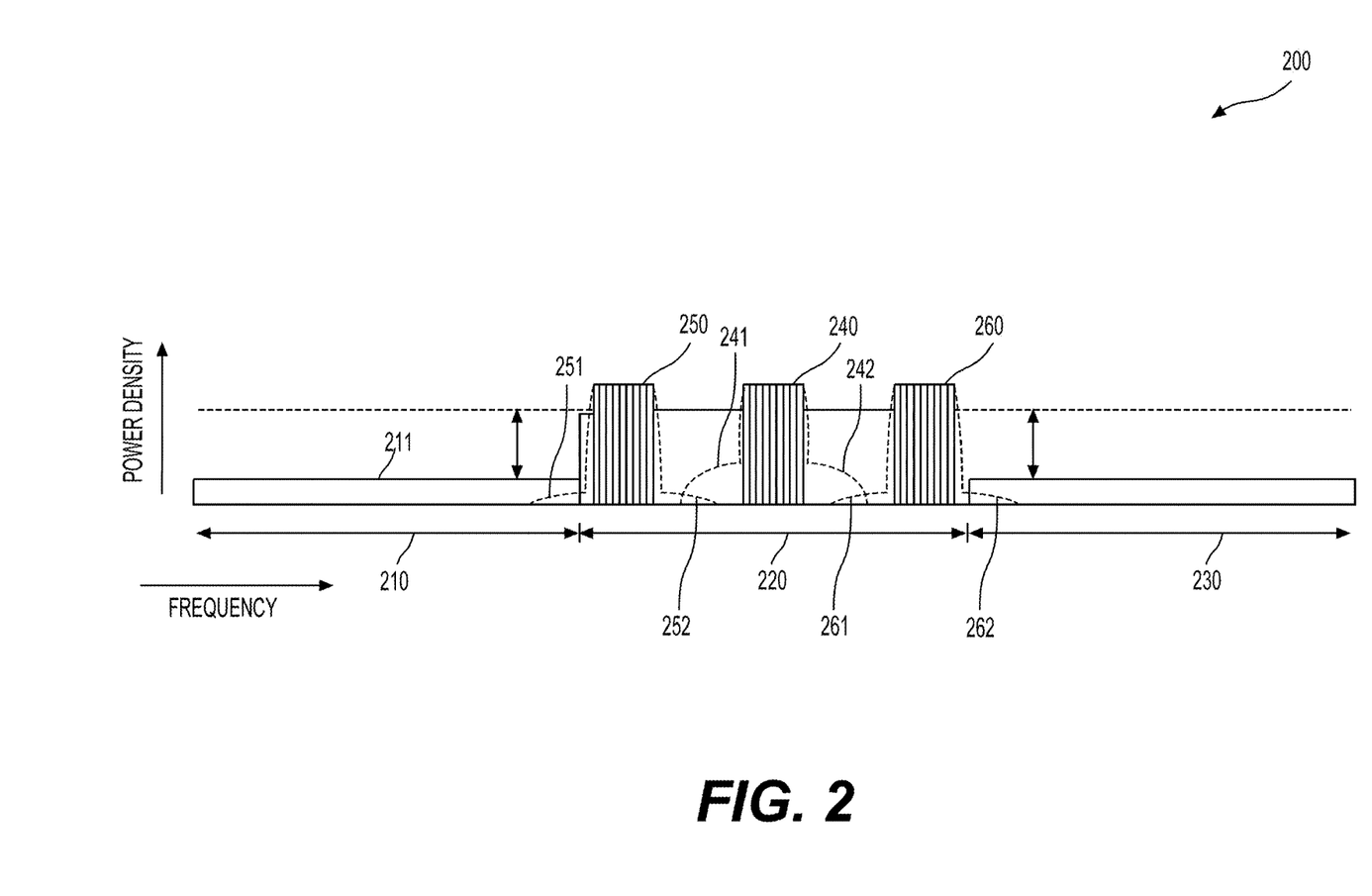
FIG. 2 shows a plot 200 of received power density spectrum according to an embodiment of the disclosure.

FIG. 2 shows a plot 200 of received power density spectrum at the first electronic device 100 according to an embodiment of the disclosure. In the plot 200, the X-axis denotes to frequency, and the Y-axis denotes power density.

In the FIG. 2 example, the plot 200 shows a first channel of a frequency range 210, a second channel of a frequency range 220 and a third channel of a frequency range 230. In an example, the second channel of the frequency range 220 is assigned to the cell 101, and the adjacent channels of the frequency ranges 210 and 230 are assigned to adjacent cells to the cell 101. The frequency range 220 includes a plurality of sub-bands, such as a first sub-band 240, a second sub-band 250 and a third sub-band 260. Of the three sub-bands, the first sub-band 240 is closer to the center frequency of the frequency range 220, the second sub-band 250 is closer to the lower frequency boundary of the frequency range 220, and the third sub-band 260 is closer to the upper frequency boundary of the frequency range 220. In an example, the first sub-band 240 is allocated to the second electronic device 160a, the second sub-band 250 and the third sub-band 260 are respectively allocated to the second electronic devices 160b and 160c.

According to an aspect of the disclosure, generally, the cell 101 is configured to have a relatively even power density at the first electronic device 110. In an embodiment, the first electronic device 110 determines distances from the second electronic devices 160a-160c to the first electronic device 110. Further, the first electronic device 110 determines the transmission power for uplink communication from the second electronic devices 160a-160c based on the distances, and provides instructions to the second electronic devices 160a-160c to instruct the second electronic devices 160a-160c to transmit uplink communication according to the determined transmission power. For example, the first electronic device 110 instructs the second electronic device 160a to use relatively high transmission power to transmit the uplink communication, and instructs the second electronic device 160b and 160c to use relatively low transmission power to transmit the uplink communication, thus the first electronic device 110 receives signals from the second electronic devices 160a-160c of about the same power density level.

Generally, radio frequency circuitry, such as a mixer, an amplifier, and the like, has non-linear characteristics that can cause power leakage. For example, the third order non-linearity can cause power leakage to other frequencies. In the FIG. 2 example, the third order non-linearity can cause side lobes in the nearby frequencies. The power leakage for the sub-band 250 is shown as side lobes 251 and 252, the power leakage for the sub-band 240 is shown as side lobes 241 and 242, and the power leakage for the sub-band 260 is shown as side lobes 261 and 262. Due to the relatively large transmission power by the second electronic device 160a, the side lobes 241 and 242 have higher power density than the side lobes 251, 252, 261 and 262.

According to an aspect of the disclosure, the sub-bands 250 and 260 that are closer to the frequency boundaries of the second channel are respectively allocated to the nearby second electronic devices 160b and 160c, thus the power leakage by the nearby second electronic devices 160b and 160c to the adjacent channels is relatively low, and the inter-channel interference can be reduced. The sub-band 240 that is closer to the center frequency of the second channel is allocated to the far-out second electronic device 160a, the power leakage by the far-out second electronic device 160a is within the second channel, which is expected to have less impact to adjacent channels.

In some embodiments, to reduce inter-channel interference, the power leakage into the adjacent channels is required to below a threshold, such as a threshold shown as 211. In an example, when the power leakage into the adjacent channel is higher than the threshold, the first electronic device 110 raises a maximum power reduction (MPR) parameter to reduce transmission power by the second electronic devices, and to reduce the power leakage into the adjacent channels. Thus, when the sub-band 240 that is closer to the center frequency of the shared channel is allocated to the far-out second electronic device 160a, the maximum power reduction requirement can be minimized in an example.

According to another aspect of the disclosure, the first electronic device 110 is configured to allocate resource elements of contiguous frequency to a second electronic device to reduce power consumption at the second electronic device and further reduce maximum power reduction (MPR) and/or reduce additional MPR (A-MPR).

Figure 3:
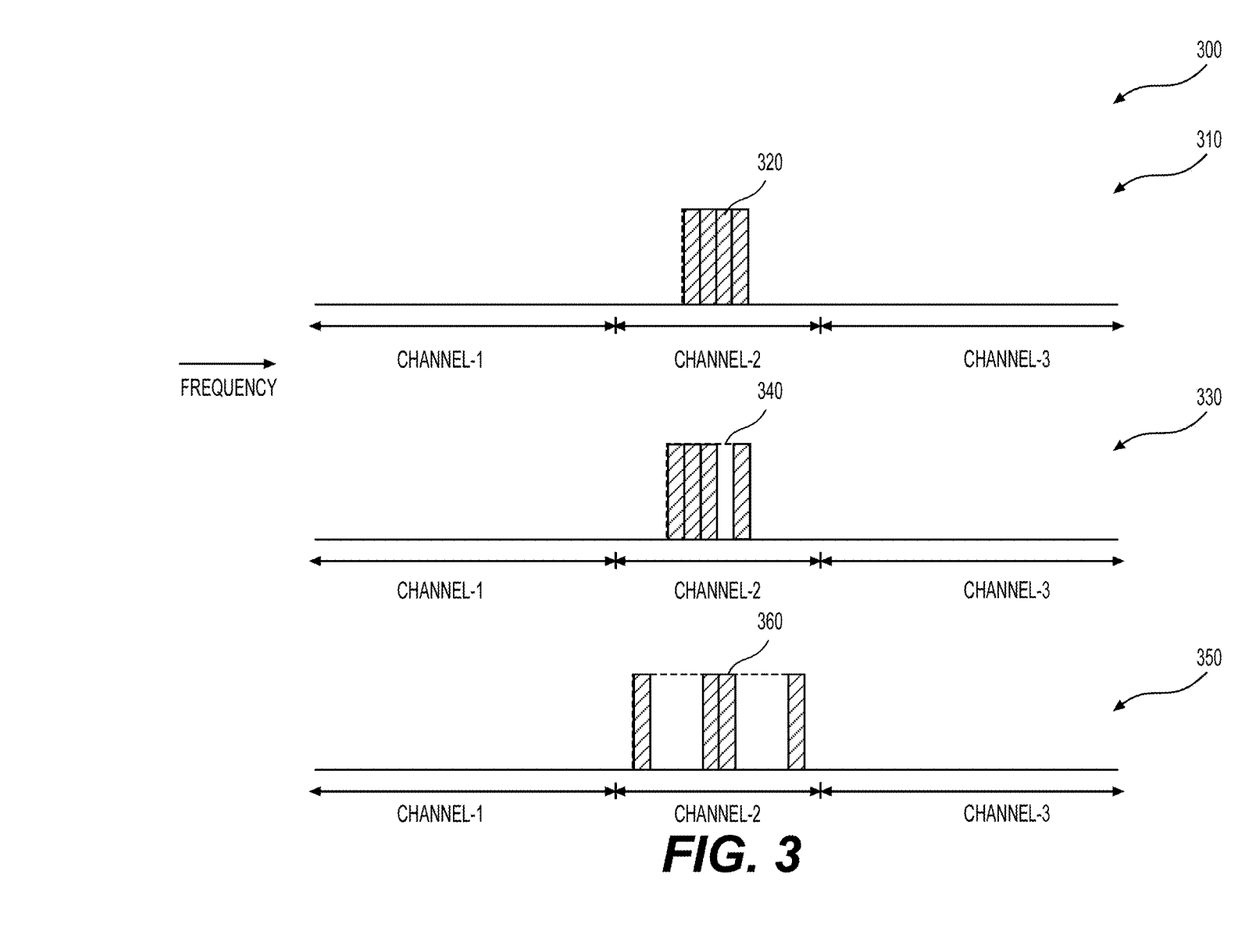
FIG. 3 shows a plot 300 of resource allocation profiles according to embodiments of the disclosure.

FIG. 3 shows a plot 300 of resource allocation profiles according to an embodiment of the disclosure. The plot 300 shows a first resource allocation profile 310, a second resource allocation profile 330, and a third resource allocation profile 350.

In the first resource allocation profile 310, the shaded resource elements in the channel-2 are allocated to, for example a second electronic device, such as the second electronic device 160a. The allocated resource elements are contiguous in frequency as shown by a sub-carrier distribution range 320. In an example, the second electronic device can ignore the frequencies that are out of the sub-carrier distribution range 320.

The second resource allocation profile 330 has non-contiguous resource element allocation to the second electronic device as shown by a sub-carrier distribution range 340. Due to the non-contiguous resource element allocation, the frequency range of the sub-carrier distribution range 340 is wider than that of the sub-carrier distribution range 320. In an example, with the second resource allocation profile 330, the second electronic device operates on certain frequencies that are not allocated to the second electronic device and consumes additional power.

The third resource allocation profile 350 spreads the resource elements that are allocated to the second electronic device over the frequency domain of the channel-2, and some resource elements are at the lower frequency boundary of the channel-2 and some resource elements are at the upper frequency boundary of the channel-2 as shown by the sub-carrier distribution range 360. The frequency range of the sub-carrier distribution range 360 is larger than that of the sub-carrier distribution range 320 and the sub-carrier distribution range 340. In an example, with the third resource allocation profile 350, the second electronic device operates on frequencies that are not allocated to the second electronic device and consumes additional power.

Further, according to an aspect of the disclosure, the second electronic device, such as the second electronic device 160a, is configured to adjust a frequency of a local oscillator based on the sub-carrier distribution range of the recourse elements that are allocated to the second electronic device. In an embodiment, the second electronic device is configured to adjust a frequency of a reference signal (e.g., a periodic signal) that is generated by the local oscillator to the center frequency of the allocated sub-carrier distribution range. The second electronic device then transmits and receives signals based on the reference signal.

In some embodiments, when resource elements are allocated with contiguous frequency, such as the sub-carrier distribution range 320, the shifting of local oscillator frequency further confines the frequency spectrum of the uplink communication, and potentially allows the a cell, such as the cell 101 to reduce the MPR or additional MPR (A-MPR) requirements.

Specifically, referring back to the FIG. 1 example, the first electronic device 110 includes a first transceiver 113 and a first processing circuitry 120 coupled together. In the example, the first processing circuitry 120 includes a resource allocation controller 130 that is configured to allocation transmission resources to the second electronic devices 160a-160c based on distances from the first electronic device 110 to the second electronic devices 160a-160c. The first electronic device 110 can include other suitable components (not shown), such as processors, memory, and the like.

The second electronic device 160a includes a second transceiver 163a and a second processing circuitry 170a coupled together. The second processing circuitry 170a includes control circuitry 180a configured to control a local oscillator 168a based on a sub-carrier distribution of the resource elements that are allocated to the second electronic devices 160a. The second electronic device 160a can include other suitable components (not shown), such as processors, memory, and the like. Other second electronic devices are configured similarly as the second electronic device 160a.

The first transceiver 113 is configured to receive and transmit wireless signals. In an example, the first transceiver 113 includes a receiving circuit RX 116 and a transmitting circuit TX 115. The receiving circuit RX 116 is configured to generate electrical signals in response to captured electromagnetic waves by an antenna 114, and process the electrical signals to extract digital samples from the electrical signals. For example, the receiving circuit RX 116 can filter, amplify, down convert, and digitalize the electrical signals to generate the digital samples. The receiving circuit RX 116 can provide the digital samples to the first processing circuitry 120 for further processing.

In an example, the transmitting circuit TX 115 is configured to receive digital stream (e.g., output samples) from the first processing circuitry 120, process the digital stream to generate radio frequency (RF) signals, and cause the antenna 114 to emit electromagnetic waves in the air to carry the digital stream. In an example, the transmitting circuit TX 115 can convert the digital stream to analog signals, and amplify, filter and up-convert the analog signals to generate the RF signals.

According to an aspect of the disclosure, the resource allocation controller 130 is configured to receive distance information of the second electronic devices 160a-160c from a distance detector (not shown), and allocate resource elements in a shared channel (e.g., uplink communication channel, a downlink communication channel) for communication with the second electronic devices 160a-160c based on the distance information.

In some embodiments, the resource allocation controller 130 is configured to allocate resource elements that are closer to the center frequency of the shared channel to the far-out second electronic devices, and allocate resources elements that are closer to the boundary frequencies of the shared channel to the nearby second electronic devices.

In some embodiments, the resource allocation controller 130 is configured to allocate resource elements by sub-bands. The resource allocation controller 130 is configured to allocate a sub-band (e.g., the sub-band 240) that is closer to the center frequency of the shared channel to a far-out second electronic device, such as the second electronic device 160a, and allocate a sub-band (e.g., the sub-band 250, or the sub-band 260) that is closer to a frequency boundary of the shared channel to a nearby second electronic device, such as one of the second electronic devices 160b and 160c.

Further, the first electronic device 110 operates based on the resource allocation that is determined by the resource allocation controller 130. In an example, for downlink communication, the first processing circuitry 120 encodes downlink control information into downlink control bits and encodes data to the second electronic devices 160a-160c into data bits. Further, the first processing circuitry 120 maps the downlink control bits and the data bits to the resource elements according to the resource allocation that is determined by the resource allocation controller 130. Further, the first processing circuitry 120 generates a digital stream based on the resource element mapping results. The digital stream is provided to the transmitting circuit TX 115 for transmission.

In some embodiments, the downlink control information can includes resource allocation information for downlink communication and/or resource allocation information for uplink communication.

It is noted that the resource allocation controller 130 can be implemented using various techniques. In an example, the resource allocation controller 130 is implemented as integrated circuits. In another example, the resource allocation controller 130 is implemented as one or more processors executing software instructions.

The second transceiver 163*a* is configured to receive and transmit wireless signals. In an example, the second transceiver 163*a* includes a receiving circuit RX 166*a* and a transmitting circuit TX 165*a*. The receiving circuit RX 166*a* is configured to generate electrical signals in response to capture electromagnetic waves by an antenna 164*a*, and process the electrical signals to extract digital samples from the electrical signals. For example, the receiving circuit RX 166*a* can filter, amplify, down-convert, and digitalize the electrical signals to generate the digital samples. The receiving circuit RX 166*a* can provide the digital samples to the second processing circuitry 170*a* for further processing.

In an example, the transmitting circuit TX 165*a* is configured to receive a digital stream (e.g., output samples) from the second processing circuitry 170*a*, process the digital stream to generate radio frequency (RF) signals, and cause the antenna 164*a* to emit electromagnetic waves in the air to carry the digital stream. In an example, the transmitting circuit TX 165*a* can convert the digital stream to analog signals, and amplify, filter and up-convert the analog signals to generate the RF signals.

According to an aspect of the disclosure, the second processing circuitry 170*a* can decode control information from received signals, and extracts resource allocation information. The resource allocation information is indicative of allocated resource elements to the second electronic device 160*a* in the time and frequency domain. In an example, the control circuitry 180*a* determines a center frequency of the frequency range of the allocated resource elements, and provides control signals to the local oscillator 168*a*. The control signals control the local oscillator 168*a* to oscillate and generate a reference signal of the center frequency. The reference signal is provided to the transceiver 163*a*. The transceiver 163*a* transmits and/or receives signals based on the reference signal.

It is noted that, in an example, when the local oscillator 168*a* is adjusted, the second electronic device 160*a* waits a time that is longer than a frequency settling time of the local oscillator 168*a* before transmission.

In some embodiments, the second processing circuitry 170*a* is configured to receive the digital samples from the receiving circuit RX 166*a*, process the digital samples to generate symbols in the frequency range that has resource elements allocated to the second electronic device 160*a*. The second processing circuitry 170*a* decodes the symbols in the frequency range to extract downlink data to the second electronic device 160*a* for example. In an example, the second processing circuitry 170*a* ignores symbols that are out of the frequency range to save power.

In some embodiments, the second processing circuitry 170*a* can also process uplink data according to suitable channel coding technique, such as error detection coding technique, rate matching coding technique, low density parity check (LDPC) coding technique, polar coding technique and the like. The processed uplink data is suitably modulated and multiplexed. In an example, the uplink data can be modulated using suitable modulation technique, such as quadrature phase shift keying (QPSK) and the like, and can be multiplexed using suitable multiplexing technique, such as orthogonal frequency-division multiplexing (OFDM) and the like. Then, the modulated symbols are interleaved and mapped to physical resource elements (REs) that are allocated to the second electronic device 160*a* for data transmission.

The second processing circuitry 170*a* then generates the digital stream based on the resource element mapping results of the data processing.

It is noted that the second processing circuitry 170*a* can be implemented using various techniques. In an example, the second processing circuitry 170*a* is implemented as integrated circuits. In another example, the second processing circuitry 170*a* is implemented as one or more processors executing software instructions.

It is also noted that while single antenna per device is used in the FIG. 1 example, the communication system 100 can be suitably modified to use multiple input, multiple output (MIMO) antenna technology.

Figure 4:
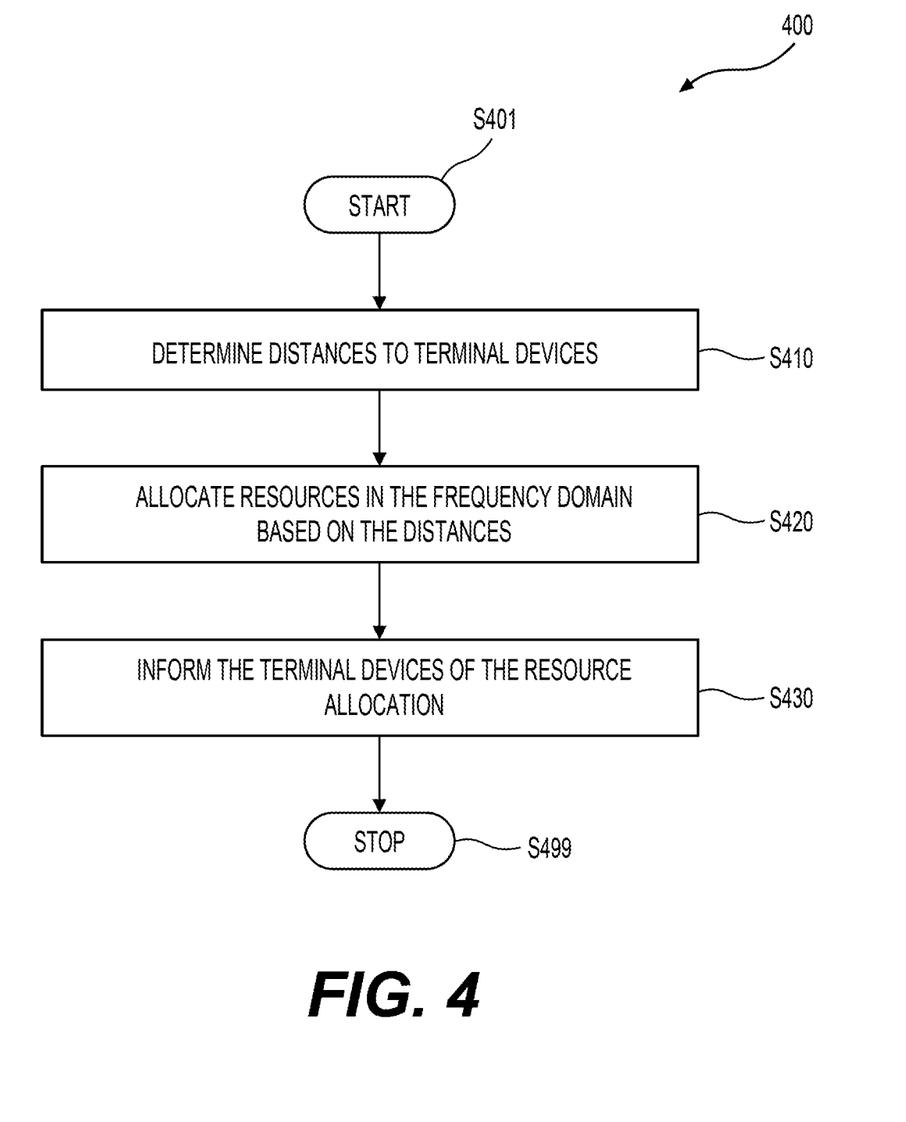
FIG. 4 shows a flow chart outlining a process 400 according to an embodiment of the disclosure.

FIG. 4 shows a flow chart outlining a process 400 according to an embodiment of the disclosure. In an example, the process 400 is executed in a control apparatus, such as by the first processing circuitry 120 in the first electronic device 110. The process starts at S401 and proceeds to S410.

At S410, distances to terminal devices are determined. In an embodiment, the first processing circuitry 120 detects multiple terminal devices, such as the second electronic devices 160*a*-160*c*, in the cell. Thus, the multiple terminal devices share communication resources in a channel that is assigned to the cell. In an example, for each terminal device, the first processing circuitry 120 determines a distance to the terminal device based on the strength of a received signal that is transmitted from the terminal device.

At S420, resource elements are allocated in the frequency domain based on the distances. In some embodiments, the first processing circuitry 120 allocates resource elements that are closer to the center frequency of the channel to a far-out terminal device, and allocate resources elements that are closer to a boundary frequency of the channel to a nearby terminal device.

In an example, the first processing circuitry 120 allocates resource elements by sub-bands. For example, the first processing circuitry 120 allocates the sub-band 240 that is closer to the center frequency of the channel to the second electronic device 160*a*, allocates the sub-band 250 that is closer to the lower frequency boundary of the channel to the second electronic device 160*b* and allocates the sub-band 260 that is closer to the upper frequency boundary of the channel to the second electronic device 160*c*.

At S430, the resource allocation information is informed to the terminal devices. For example, the first processing circuitry 120 can generate control information (e.g., downlink control information) to include the resource allocation information. The resource allocation information is indicative of the allocated resource elements in the time and frequency domain to the respective second electronic devices 160*a*-*c*. The control information is transmitted to the second electronic devices 160*a*-*c*. Thus, the communication between the first electronic device 110 and the second electronic devices 160*a*-*c* is performed based on the resource allocation information. Then, the process proceeds to S499 and terminates.

Figure 5:
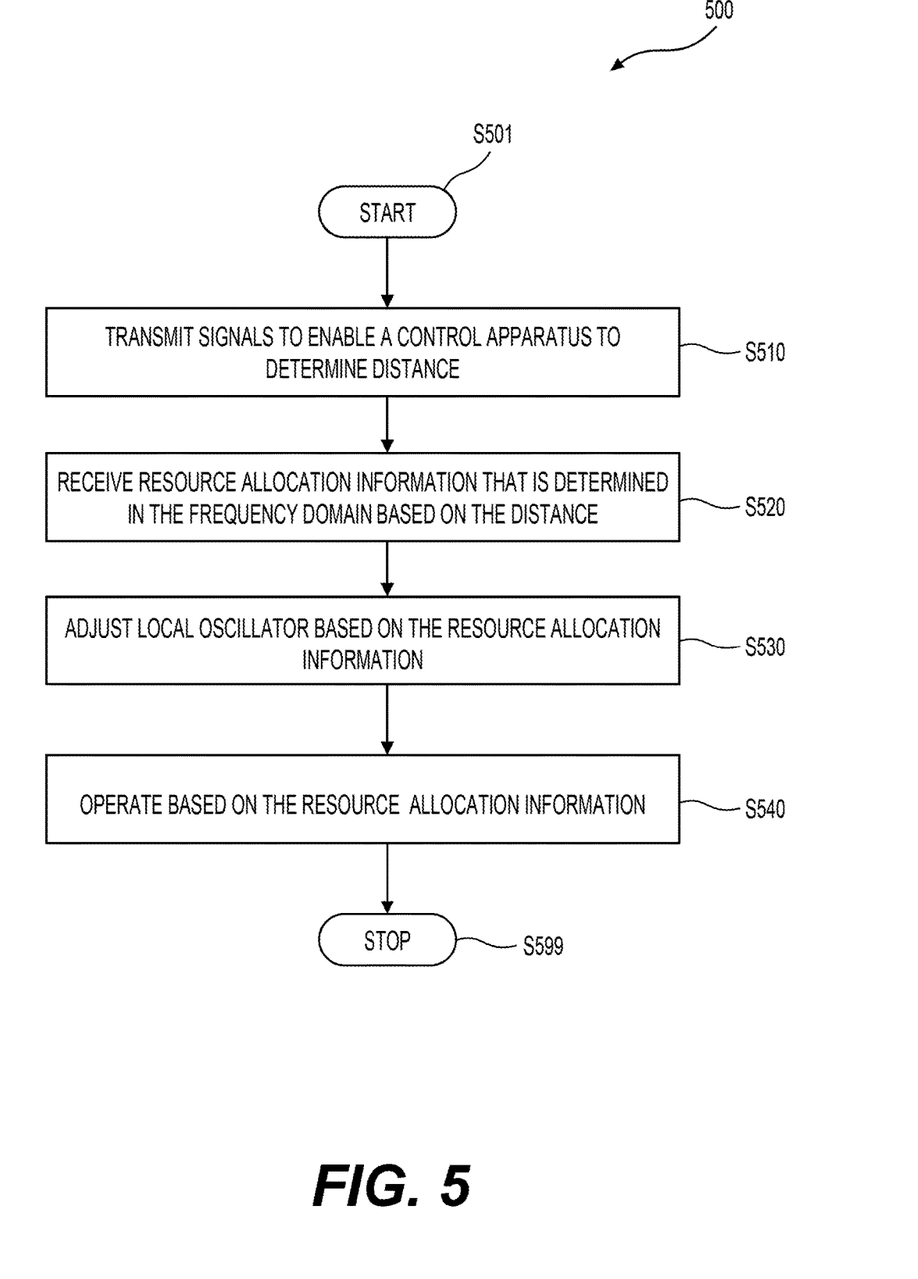
FIG. 5 shows a flow chart outlining a process 500 according to an embodiment of the disclosure.

FIG. 5 shows a flow chart outlining a process 500 according to an embodiment of the disclosure. In an example, the process 500 is executed in a terminal device, such as by the second electronic device 160a. The process starts at S501 and proceeds to S510.

At S510, signals are transmitted to enable a control apparatus to determine a distance to the control apparatus. In the FIG. 1 example, the first electronic device 110 is a base station of a cell and a control apparatus of the cell. The second electronic device 160a transmits signals to the first electronic device 110 to enable the first electronic device 110 to determine a distance between the first electronic device 110 and the second electronic device 160a. In an example, the second electronic device 160a transmits a signal using a transmission power level that is known to the first electronic device 110. The first electronic device 110 can receive the signal and detect a received power level. Further, the first electronic device 110 can calculate a path loss based on the transmission power level and the received power level, and can determine the distance based on the path loss. In another example, the first electronic device 110 compares the received power level to a threshold to determine the distance. For example, when the received power level is lower than the threshold, the first electronic device 110 determines that the second electronic device 160a is a far-out terminal device with a relatively long distance to the first electronic device 110.

At S520, resource allocation information is received. The resource allocation information is determined in the frequency domain based on the distance. In an example, the first electronic device 110 determines that the second electronic device 160a is a far-out terminal device and allocates resource elements, such as resource elements in the sub-band 240 that are close to the center frequency of the channel, to the second electronic device 160a. The first electronic device 110 can generate control information (e.g., downlink control information) to include the resource allocation information. The resource allocation information is indicative of the allocated resource elements in the time and frequency domains to the respective second electronic devices 160a-c. The first electronic device 110 transmits signals carrying the control information. The second electronic device 160a receives the signals and extracts the control information and the resource allocation information.

At S530, a local oscillator is adjusted based on the resource allocation information. In an example, the second processing circuitry 170a determines that the sub-band 240 is allocated to the second electronic device 160a. Further, the second processing circuitry 170a determines the center frequency of the sub-band 240, and provides control signals to the local oscillator 168a to change the oscillation frequency to the center frequency. The local oscillator 168a provides a reference signal to the transceiver 163a. The transceiver 163a operates based on the reference signal.

At S540, communication is performed based on the resource allocation information. In an example, when a sub-band is allocated to the second electronic device 160a for downlink communication, the second electronic device 160a can receive signals in the sub-band and ignore signals in other frequency bands to save power. In another example, when a sub-band is allocated to the second electronic device 160a for uplink communication, the second electronic device 160a maps data to the allocated resource elements in the sub-band for uplink communication. The process proceeds to S599 and terminates.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A control apparatus, comprising:
    transceiver circuitry configured to transmit/receive signals from a plurality of terminal devices using a shared channel; and
    processing circuitry configured to:
    determine (i) a first distance between the control apparatus and a first terminal device and (ii) a second distance between the control apparatus and a second terminal device, the second distance being longer than the first distance,
    allocate a first resource element of a first frequency to the first terminal device and a second resource element of a second frequency to the second terminal device, the second frequency being closer to the center frequency of the shared channel than the first frequency, and
    communicate, via the transceiver circuitry, with the first and second terminal devices according to the allocation.

2. The control apparatus of claim 1, wherein the processing circuitry is configured to allocate a group of resource elements that are contiguous in frequency to a terminal device.

3. The control apparatus of claim 2, wherein the processing circuitry is configured to:
    allocate a first group of resource elements that are contiguous in frequency to the first terminal device; and
    allocate a second group of resource elements that are contiguous in frequency to the second terminal device, the second terminal device has a longer distance to the control apparatus than the first terminal device, the second group of resource elements is closer to a center frequency of the shared channel than the first group of resource elements.

4. The control apparatus of claim 1, wherein the processing circuitry is configured to determine transmission power levels for the terminal devices according to the distances.

5. The control apparatus of claim 1, wherein the processing circuitry is configured to avoid an allocation of the first resource element near an upper frequency boundary of the shared channel and the second resource element near a lower frequency boundary of the shared channel to a same terminal device.

6. The control apparatus of claim 1, wherein the processing circuitry is configured to:
    allocate a first frequency sub-band of the shared channel to the first terminal device; and
    allocate a second frequency sub-band of the shared channel to the second terminal device, the second terminal device has a longer distance to the control apparatus than the first terminal device, and the second frequency sub-band is closer to a center frequency of the shared channel than the first frequency sub-band.

7. A method for resource scheduling, comprising:
    determining, by processing circuitry in a control apparatus, (i) a first distance between the control apparatus and a first terminal device and (ii) a second distance between the control apparatus and a second terminal device, the second distance being longer than the first distance;

allocating a first resource element of a first frequency to the first terminal device and a second resource element of a second frequency to the second terminal device, the second frequency being closer to the center frequency of a shared channel than the first frequency; and communicating, via interface circuitry of the control apparatus, with the first and second of terminal devices according to the allocation.

8. The method of claim 7, wherein allocating the resource elements in the shared channel according to the distances further comprises:

allocating a group of resource elements that are contiguous in frequency to a terminal device.

9. The method of claim 8, wherein allocating the resource elements in the shared channel according to the distances further comprises:

allocating a first group of resource elements that are contiguous in frequency to the first terminal device; and allocating a second group of resource elements that are contiguous in frequency to the second terminal device, the second terminal device having a longer distance to the control apparatus than the first terminal device, the second group of resource elements being closer to a center frequency of the shared channel than the first group of resource elements.

10. The method of claim 7, further comprising:

determining transmission power levels for the terminal devices according to the distances.

11. The method of claim 7, wherein allocating the resource elements in the shared channel according to the distances further comprises:

avoiding an allocation of the first resource element near an upper frequency boundary of the shared channel and the second resource element near a lower frequency boundary of the shared channel to a same terminal device.

12. The method of claim 7, wherein allocating the resource elements in the shared channel according to the distances further comprises:

allocating a first frequency sub-band of the shared channel to the first terminal device; and allocating a second frequency sub-band of the shared channel to the second terminal device, the second terminal device having a longer distance to the control apparatus than the first terminal device, and the second frequency sub-band being closer to a center frequency of the shared channel than the first frequency sub-band.

13. An apparatus, comprising:

transceiver circuitry configured to receive wireless signals that are indicative of resource allocation information of resource elements in a channel that is shared by the apparatus and other apparatuses, the resource allocation information being determined by a control apparatus that allocates the resource elements in the channel based on a first distance between the control apparatus and the apparatus and a second distance between the control apparatus and another apparatus, wherein a first resource element of a first frequency to the apparatus and a second resource element of a second frequency to the other apparatus are allocated, the second frequency being closer to the center frequency of the shared channel than the first frequency; and processing circuitry configured to extract the resource allocation information, and communicate with the control apparatus using the resource elements in the channel according to the resource allocation information.

14. The apparatus of claim 13, wherein:

an oscillator is configured to oscillate at an oscillation frequency, and provide a reference signal to the transceiver circuitry; and the processing circuitry is configured to control the oscillator to adjust the oscillation frequency according to the resource allocation information.

15. The apparatus of claim 14, wherein the processing circuitry is configured to control the transceiver circuitry to wait for the oscillator to settle after an adjustment of the oscillation frequency.

16. The apparatus of claim 14, wherein the processing circuitry is configured to determine a center frequency of allocated resource elements to the apparatus, and control the oscillator to oscillate at the center frequency.

17. The apparatus of claim 13, wherein the processing circuitry is configured to extract the resource allocation information that is indicative of allocated resource elements to the apparatus, the allocated resource elements being contiguous in a frequency range.

18. The apparatus of claim 17, wherein the processing circuitry is configured to decode symbols according to the frequency range.

* * * * *